United States Patent [19]
Watanabe et al.

[11] Patent Number: 5,922,487
[45] Date of Patent: *Jul. 13, 1999

[54] ANODE ELECTROCATALYST FOR FUEL CELL AND PROCESS OF PREPARING SAME

[75] Inventors: Masahiro Watanabe, Yamanashi; Yumi Yamamoto, Kanagawa, both of Japan

[73] Assignees: Tanaka Kikinzoku Kogyo K.K.; Masahiro Watanabe, both of Japan; Stonehart Associates, Inc., Madison, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/539,509

[22] Filed: Oct. 6, 1995

Related U.S. Application Data

[63] Continuation of application No. 08/377,457, Jan. 24, 1995, abandoned.

[51] Int. Cl.[6] ...................................................... H01M 4/86
[52] U.S. Cl. .............................. 429/44; 429/40; 204/293; 502/305; 502/313; 502/325; 502/339; 420/900; 420/466
[58] Field of Search .................................. 429/40, 42, 45, 429/44; 502/305, 308, 310, 313, 325, 326, 339, 352; 204/293; 420/900, 466

[56] References Cited

U.S. PATENT DOCUMENTS

| | | | |
|---|---|---|---|
| 3,340,097 | 9/1967 | Hess et al. | 429/40 |
| 3,506,494 | 4/1970 | Adlhart | 429/40 |
| 3,691,102 | 9/1972 | Swift | 252/469 |
| 4,373,014 | 2/1983 | Landsman et al. | 429/44 |
| 4,490,482 | 12/1984 | Mathieu | 502/339 |
| 5,346,780 | 9/1994 | Suzuki | 429/42 |
| 5,380,696 | 1/1995 | Sawada et al. | 502/317 |

*Primary Examiner*—Bruce F. Bell
*Attorney, Agent, or Firm*—Klauber & Jackson

[57] ABSTRACT

Disclosed is an anode electrocatalyst for a fuel cell comprising an alloy essentially consisting of at least one of tin, germanium and molybdenum, and one or more noble metals selected from platinum, palladium and ruthenium.

The tin, germanium and/or molybdenum gas the ability of depressing the poisioning of the noble metal with carbon monoxide so that fuel containing a relatively high content of the carbon monoxide may be supplied to a fuel cell equipped with anode in accordance with the present invention which is otherwise liable to be poisioned.

3 Claims, 4 Drawing Sheets

ANODE ELECTROCATALYST FOR FUEL CELL AND PROCESS OF PREPARING SAME

This application is a continuation of application Ser. No. 08/377,457, filed Jan. 24, 1995, now abandoned.

BACKGROUND OF THE INVENTION

This invention relates to an anode electrocatalyst composed of an alloy essentially consisting of at least one of tin, germanium and molybdenum, and one or more noble metal employed as an anode of a fuel cell and its preparation.

A solid polymer electrolyte fuel cell attracts more attention as an electric power source of an electric automobile and a space craft compared with a phosphoric acid fuel cell because it is compact and may take out high current density. Various electrode structures, preparations of catalysts and systems utilizing these catalysts and electrodes have been proposed.

The electrode structure of a conventional fuel cell is ordinarily a five-layered sandwich structure which consists of a cathode current collector, a cathode, a solid polymer electrolyte (ion exchange membrane), an anode and an anode current collector.

Fuel supplied to this fuel cell is prepared by means of, for example, reforming methanol, which contains carbon dioxide and carbon monoxide other than hydrogen. As an anode of the fuel cell, a substrate composed of a gas permeable carbon textile or the like carrying platinum metal catalyst particles and/or platinum-supporting catalyst particles consisting of carbon black and platinum metal catalyst particles supported thereon together with perfluorocarbon sulphonic acid and polytetrafluoroethylene (hereinafter referred to as "PTFE") formed as a layer has been frequently employed. However, the platinum and the platinum-supporting catalyst are liable to be poisoned with the carbon monoxide contained in the above fuel especially in the solid polymer electrolyte fuel cell which operates in a low temperature, to considerable lower the catalytic activities.

In order to overcome these drawbacks, pure hydrogen is desirably employed as fuel, but the pure hydrogen is not only expensive but also costly in its storage. For example, liquid hydrogen is liable to be scattered from a storage tank into air so that its storage is technically difficult. If the carbon monoxide is removed from the fuel prepared by the reforming of the methanol, no poisoning takes place as the pure hydrogen is supplied from the tank. However, the carbon monoxide is difficult to be completely removed from the fuel by means of a multistage treatment, and moreover this treatment is costly the same as the employment of the pure hydrogen.

Conventionally, the poisoning of the fuel cell electrode with the carbon monoxide has been the more important subject to be avoided in this field. The poisoning is a serious obstacle against the practical use of the fuel cell. In spite of various electrode materials, no fuel cell electrode has been developed which possesses a sufficient resistance to the poisoning.

Although a catalyst containing tin and a noble metal has been proposed (for example, Japanese patent laid open gazette No. 3-42040), it is intended to be employed for treating poisonous gases and consists of tin and a noble metal coated on the tin.

SUMMARY OF THE INVENTION

The present invention has been made to overcome the above drawbacks.

Accordingly, an object of the present invention is to provide an anode electrocatalyst for a fuel cell which comprising an alloy of at least one of tin, germanium and molybdenum, and one or more noble metal, especially, platinum and a process of preparing the same.

Another object of the invention is to provide an anode catalyst which possesses excellent anti-poisoning characteristics and have not heretofore been employed, and its preparation.

A further object of the invention is to provide an anode catalyst which enables the employment of a reforming gas in a solid polymer electrolyte fuel cell which is liable to be poisoned.

The present invention is an anode electrocatalyst for a fuel cell comprising an alloy essentially consisting of at least one of tin, germanium and molybdenum, and one or more noble metals selected from platinum, palladium and ruthenium.

In accordance with the present invention, the amount of the anode electrocatalyst poisoned by the carbon monoxide largely decreases compared with that of a conventional platinum electrocatalyst so that the operation can be continuously conducted at a relatively high activity over a long period of time. Moreover, little influence may be observed even when a relatively large amount of the carbon monoxide is contained in fuel supplied to a fuel cell so that no refining is required so as lo reduce the labor and the cost of the refining.

DETAILED DESCRIPTION OF THE INVENTION

Figure 1:
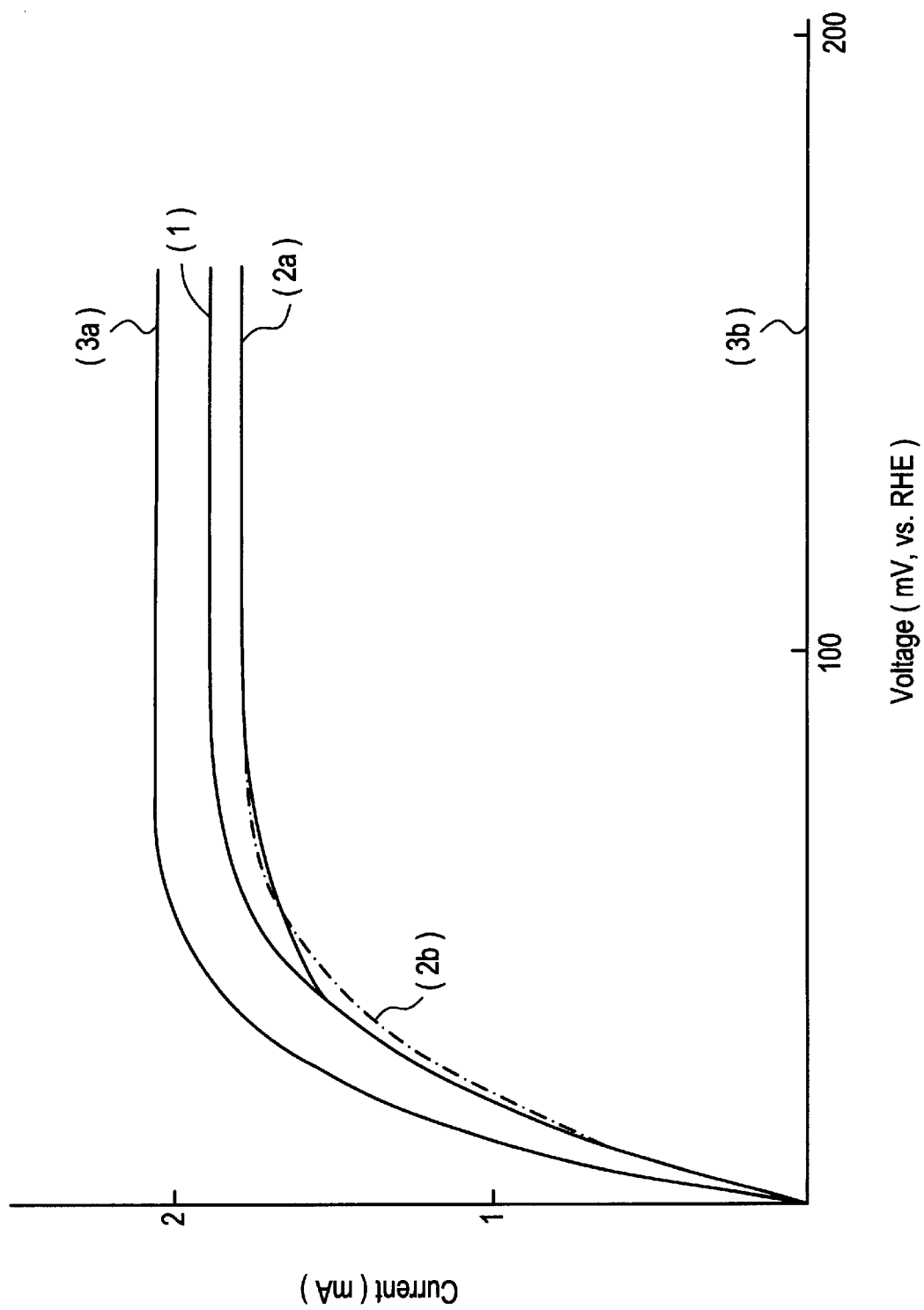
FIG. 1 is a graph showing voltage-current curves of electrodes of Examples 1 and 2 and Comparative Example 1.

A first anode electrocatalyst of the present invention is the alloy essentially consisting of 1 to 60 atomic % of tin and the balance of one or more noble metals, and the alloy of the invention includes an amorphous alloy, a solid solution and an intermetallic compound. Accordingly, the first electrocatalyst of the invention may form a layer on a substrate or be powder, and may be obtained by means of sputtering or vapor deposition under vacuum or by melting and atomizing tin and a noble metal and rapidly cooling the mixture, or the intermetallic compound represented by a formula of $SnMe_x$ (Me is platinum, palladium or ruthenium) as well as the solid solution and the oversaturated solid solution may be prepared and employed without further modification. Alternatively, the said electrocatalyst can be prepared in accordance with a process employing a tin chloride solution which will be described.

In this electrocatalyst, 1 to 60 atomic % of the tin is employed. If the tin is below 1 atomic %, the effect of preventing the poisoning of the noble metal catalyst is seldom realized. If, on the other hand, the tin is over 60 atomic % especially when a cation exchange membrane which is a solid polymer electrolyte of the fuel cell is acid form, the tin is likely to be dissolved into the electrolyte and the absolute quantity of the noble metal which act as a main catalyst substance becomes short to lower the catalytic activity.

The noble metal is selected from platinum, palladium and ruthenium, and the respective single metal or the combination thereof may be employed, and among these noble metals the platinum is most preferable. Although the components other than the tin are ordinarily composed of the said noble metal, a few amounts of other components may be contained.

In accordance with the present invention, another anode electrocatalyst for a fuel cell may be provided which is the alloy essentially consisting of 8 to 48 atomic % of tin and 62 to 98 atomic % of platinum, and contains a $Pt_3Sn$ alloy phase. The alloy of the said composition possesses a $Pt_aSn$ alloy phase therein or an alloy phase of which an atomic ratio between platinum and tin is 3:1, and the $Pt_aSn$ alloy phase possesses such an excellent electrode characteristic as anti-poisoning.

If the amount of the tin exceeds the upper limit of 48 atomic %, the $Pt_aSn$ alloy phase disappears to be converted into a PtSn phase, and if it is below the lower limit of 8 atomic %, the said phase is converted into a Pt α-single layer. The particle size thereof is preferably 10 to 60 Å, and the catalyst surface area decreases if the particle size is over 60 Å, and the catalytic activity tends to be lowered below 10 Å.

The specific surface area of the support supporting the catalyst is preferably 60 to 2000 $m^2/g$, and though no problem arises if it exceeds 2000 $m^2/g$, the particle size becomes small to slightly lower the catalytic activities. The particle size becomes too large when the particle size is below 60 $m^2/g$.

Between the above mentioned two catalysts of the tin-noble metal alloy and the tin-platinum alloy, a process of preparing the former catalyst is not particularly restricted, and the respective metals may be directly deposited on the surface of the support by means of sputtering, or the corresponding metal compound solution may be applied to the support surface which is then converted into the alloy by utilizing a thermal treatment.

On the other hand, in the preparation of the latter catalyst, not only the simple formation of the alloy of a certain composition but also the formation of the $Pt_aSn$ alloy phase are required. At first, in accordance with a conventional process, a platinum catalyst comprising a support such as carbon black and platinum supported thereon is prepared. Then, when the catalyst is suspended in a tin chloride solution and the pH is adjusted, for example, to neutral at 7 or to alkaline over 7, the platinum catalyst is coated with a thin layer of tin hydroxide which is then converted into tin oxide by means of heating the solution. When the catalyst containing the tin oxide layer is separated by filtration or the like and subjected to a thermal reduction treatment, a catalyst layer containing the $Pt_aSn$ alloy phase can be obtained. In order to appropriately form the $Pt_aSn$ alloy phase, the pH is adjusted to over 7, the solution heating is conducted at 80 to 200° C. and the heating in the hydrogen reduction is conducted at 300 to 1000° C. The heating in the hydrogen reduction at a temperature over 1000° C. may make the particle size too large to produce a liquid phase, and the heating below 300° C. may lead to insufficient reduction of the tin oxide.

In accordance with the present invention, still another electrocatalyst for a fuel cell may be provided which is the alloy essentially consisting of 1 to 70 atomic % of germanium and/or molybdenum and the balance of at least one noble metal. The alloy thereof also includes an amorphous alloy, a solid solution and an intermetallic compound. Accordingly, the said electrocatalyst may also be obtained similarly to the above alloy comprising the tin and the noble metal employing, for example, the intermetallic compound represented by a formula of $Ge_aMo_bMe_c$ (Me is platinum, palladium or ruthenium).

If the amount of the germanium and/or molybdenum is below 1 atomic %, the effect of preventing the poisoning of the noble metal catalyst is seldom realized. If, on the other hand, the amount is over 70 atomic % especially when a cation exchange membrane which is a solid polymer electrolyte of the fuel cell is acid form, the germanium and the like is liable to be dissolved into the electrolyte to lower the catalytic activity.

Although the reason why the combination of the noble metal and the tin, germanium and/or molybdenum, or the addition of the tin and the like to the noble metal depresses the poisoning of the carbon monoxide is not elucidated, it is supposed to be the synergetic effect produced by the following two effects, that is, the amount of the carbon monoxide to be adsorbed decreases or the adsorption itself is prevented because the adsorption sites for the carbon monoxide are occupied by the tin or the like, and the carbon monoxide once adsorbed is oxidized to carbon dioxide by means of the tin or the like functioning as an oxidation catalyst for the removal of the carbon monoxide. Even if about 100 ppm of the carbon monoxide is contained in the fuel supplied to the fuel cell employing the electrocatalyst of the present invention, the poisoning of the catalyst to the degree of lowering the catalytic activities seldom occurs and the stable operation can be continued though depending on the amount of the tin or the like.

In order to incorporate the catalyst in the fuel cell, after the first metal is supported on the support such as carbon black by means of a thermal decomposition method followed by the alloying with the second metal thereafter supported, or the respective metals are supported by means of sputtering or the alloy of the noble metal especially platinum and the tin is formed on the support employing the above described tin chloride solution, the support together with ion exchange resin, PTFE or the like is deposited in the form of a thin layer or a porous member on the substrate or the electrolyte membrane, and is fixed on a desired position of the fuel cell, and the substrate or the electrolyte membrane equipped with the alloy catalyst is positioned in a desired position of the fuel cell together with a separator having gas supply trenches.

A cathode which is a counter electrode of the fuel cell is not particularly restricted, and a conventional electrode which may be prepared, for example, by mixing PTFE power and carbon black supporting a catalyst and supporting the mixture on a substrate may be employed, and it way be employed after it is dipped in an electrolyte solution depending on necessity.

Since the thus prepared fuel cell contains the anode which is resistant to poisoning, little influence is produced even if the fuel contains about 100 ppm of the monoxide. Since the amount of the carbon monoxide contained in the fuel prepared by the modification of methanol is at most about 100 ppm, the said fuel may be employed without further refining.

EXAMPLES

Examples of the electrocatalyst in accordance with the present invention wilt be illustrated, these Examples are not construed to restrict the invention.

Example 1

A platinum-tin alloy thin layer was formed by simultaneous argon-sputtering of targets of platinum and tin onto a glass plate equipped with a lead terminal having a diameter of 10 mm. The glass plate was fixed on one end surface of a lot rod made of stainless steel having a diameter of 8 mm and equipped to a rotation electrode apparatus. The alloy composition was determined by quantitatively analyzing one sample simultaneously prepared by means of an ICP method.

The three rotation electrodes having the alloy composition of Pt:Sn=49:51 (atomic %) were separately dipped in a 0.1 M perchloric acid aqueous solution, and the respective electrodes were poisoned by bubbling pure hydrogen, hydrogen containing 40 ppm of carbon monoxide and hydrogen containing 100 ppm of carbon monoxide for one hour. Thereafter, voltage-current characteristics of the rotation electrodes were measured at a rotation of 1500 r.p.m. employing a platinum electrode as a counter electrode with the continuous bubbling. The results are shown in FIG. 1. The voltage-current curves of this Examples shown as (1) in FIG. 1 agree with one another regardless of the concentration of the carbon monoxide, and no influence due to the existence of the carbon monoxide is observed.

Example 2

Two rotation electrodes were prepared in accordance with the procedures of Example 1 except that the atomic ratio of platinum and tin was set to be 79:21. The two rotation electrodes were separately dipped in a 0.1 M perchloric acid aqueous solution, and the respective electrodes were poisoned by bubbling pare hydrogen and hydrogen containing 100 ppm of carbon monoxide for one hour. Thereafter, voltage-current characteristics of the rotation electrodes were Measured. As shown in FIG. 1, the voltage-current curves of the sure hydrogen (2a) and of the hydrogen containing the carbon monoxide (2b) almost agree with each other and almost no influence due to the existence of the carbon monoxide is observed.

Comparative Example 1

Two rotation electrodes were prepared in accordance with the procedures of Example 1 except that platinum was employed in place of the platinum-tin alloy. The two rotation electrodes were separately dipped in a 0.1 M perchloric acid aqueous solution, and the respective electrodes were poisoned by bubbling pure hydrogen and hydrogen containing 100 ppm of carbon monoxide for one hour. Thereafter, voltage-current characteristics of the rotation electrodes were measured with continuous bubbling. As shown in FIG. 1 since no poisoning occurred in the case the pure hydrogen (3a) was employed, a higher reaction current could be taken out than the current of the platinum-tin alloy electrode of Example 1 by the amount equal to the current decreased by the addition of the tin. When, however, the hydrogen containing the carbon monoxide (3b) was employed, no current could be taken out because the poisoning with the carbon monoxide was large.

Example 3

A rotation electrode of palladium-tin alloy was prepared in accordance with the procedures of Example 1 except that palladium was employed in place of the platinum, and a voltage-current characteristic of this rotation electrode was measured employing hydrogen containing 100 ppm of carbon monoxide as fuel. The said characteristic was slightly lower than that of the rotation electrode of Example 1, but the rotation electrode of this Example could take out a current for a long period of time.

Example 4

A rotation electrode of ruthenium-tin alloy was prepared in accordance with the procedures of Example 1 except that ruthenium was employed in place of the platinum, and a voltage-current characteristic of this rotation electrode was measured employing hydrogen containing 100 ppm of carbon monoxide as fuel. The said characteristic was substantially the same as that of the rotation electrode of Example 3.

Example 5

Platinum and tin were sputtered on the surface of an anode substrate having a diameter of 20 mm in a chamber under vacuum in accordance with the same conditions of Example 1 at a rate of 0.18 mg/cm$^2$ to prepare a fuel cell anode having platinum-tin alloy.

The anode substrate was prepared by molding a mixture of commercially available carbon black (specific surface area: 200 M$^2$/g) and commercially available PTFE powder (in the ratio of 2:1) on the surface of carbon paper having a thickness of 360 μm hydrophobically treated functioning as a current collector by means of hotpressing at 360° C. and 5 kg/cm$^4$.

After, on the other hand, 10 g of carbon black was impregnated with a a chloroplatinic acid aqueous solution (platinum concentration: 150 g/liter), a platinum carbon catalyst supporting 30% in weight of platinum was prepared by means of thermal treatment. The carbon catalyst was impregnated with a commercially available ion exchange resin dispersion solution (Naflon solution) and was dried to form an ion exchange resin layer on its surface. The catalyst powder was fractionated so that the average amount of the supported platinum was adjusted to be 0.3 mg/cm$^2$, and it was redispersed in alcohol.

After this dispersion was filtered under weak suction so that the catalyst power was adhered to filter paper having a diameter of 50 mm leaving a slight amount of the alcohol thereon, the filter paper was hotpressed at 130° C. and 5 kg/cm$^2$ together with carbon paper hydrophobically treated functioning as a current collector having a diameter of 20 mm and a thickness of 360 μm to prepare a cathode equipped with the current collector.

These two electrodes were closely adhered to the respective sides of Naflon (made by Du Pont) having a diameter of 30 mm and a thickness of 150 μm which was a perfluorocarbon ion exchange membrane having bolt apertures on its four corners, and a pair of fastening plates made of brass having a length of 5 cm, a width of 5 cm and a thickness of 10 mm and having its inner surface a plenty of concave planes and its four corners bolt apertures were placed on the respective outer surfaces of the two electrodes. A fuel cell was assembled by inserting four bolts into the four bolt apertures of the four corners of the both fastening plates and by fastening the end of the bolts with four nuts.

Three fuel cells thus prepared were continuously operated while the three fuels the same as those of Example 1 were separately supplied. The initial activities of the three fuel cells were almost the same and the performance was not lowered so that no poisoning with the carbon monoxide occurred.

Example 6

Four catalysts consisting of a carbon support and 30% in weight of platinum with respect to the carbon support supported thereon were prepared. After the four catalysts were dispersed in the respective four stannous chloride aqueous solutions of which the respective tin concentrations were adjusted to 10 atomic %, 20 atomic %, 30 atomic % and 40 atomic % with respect to the platinum amount of the respective catalysts employing an ultrasonic homogenizer, the pH of the solutions were adjusted to 8.2 with ammonia.

Then, the solutions were heated at 96° C. with stirring so that tin oxide was deposited on the catalysts. After the catalysts were separated by means of filtration and dried. they were thermally treated at 900° C. for 30 minutes in a nitrogen mixed stream containing 20% of hydrogen.

These four catalysts were identified with XRD (X-ray diffraction) to find out alloy phases as summarized in Table 1. The particle sizes were measured with TEM, and the specific surface areas thereof and the surface areas of the metals (platinum) were measured. The respective values are summarized in Table 1.

The above four catalysts were impregnated with a commercially available solid polymer (composition: perfluorocarbon sulphonic acid)

TABLE I

| Amount of Tin | 10 atomic % | 20 atomic % | 30 atomic % | 50 atomic % |
| --- | --- | --- | --- | --- |
| Alloy Phase | Pt α Phase & $Pt_2Sn$ Phase | Pt α Phase & $Pt_2Sn$ Phase | $Pt_2Sn$ Phase & PtSn Phase | PtSn Phase |
| Particle Size | 36 Å | 46 Å | 51 Å | 57 Å |
| Specific Surface Area (TEM) | 73 m$^2$/g | 75 m$^2$/g | 80 m$^2$/g | 80 m$^2$/g |
| Specific Surface Area (CO Adsorption) | 51 m$^2$/g | 38 m$^2$/g | 21 m$^2$/g | 10 m$^2$/g | dispersion solution, and then dried to adhere 30% in weight of the said solid polymer on its surface. Then, by means of a filtration transcription method. the catalysts were transcribed on carbon paper hydrophobically treated and hotpressed at 130° C. to obtain anode electrodes having a thickness of 20 μm for a fuel cell having the above identified compositions.

Comparative Example 2

After 10 g of carbon black powder was impregnated with a chloroplatinic acid aqueous solution (platinum concentration: 5 g/liter), two kinds of platinum-carbon catalysts of which supported platinum amounts were 20 and 40% in weight were prepared by means of reduction treatment employing as hydrazine as a reducing agent. The both carbon catalysts were impregnated with a commercially available solid polymer (composition: perfluorocarbon sulphonic acid) dispersion solution, and then dried to adhere 30% in weight of the said solid polymer on its surface. Then, by means of a filtration transcription method, the catalysts were transcribed an carbon paper hydrophobically treated and hotpressed at 130° C. to obtain anode electrodes having a thickness of 20 μm for a fuel cell having the above identified composition.

Figure 2:
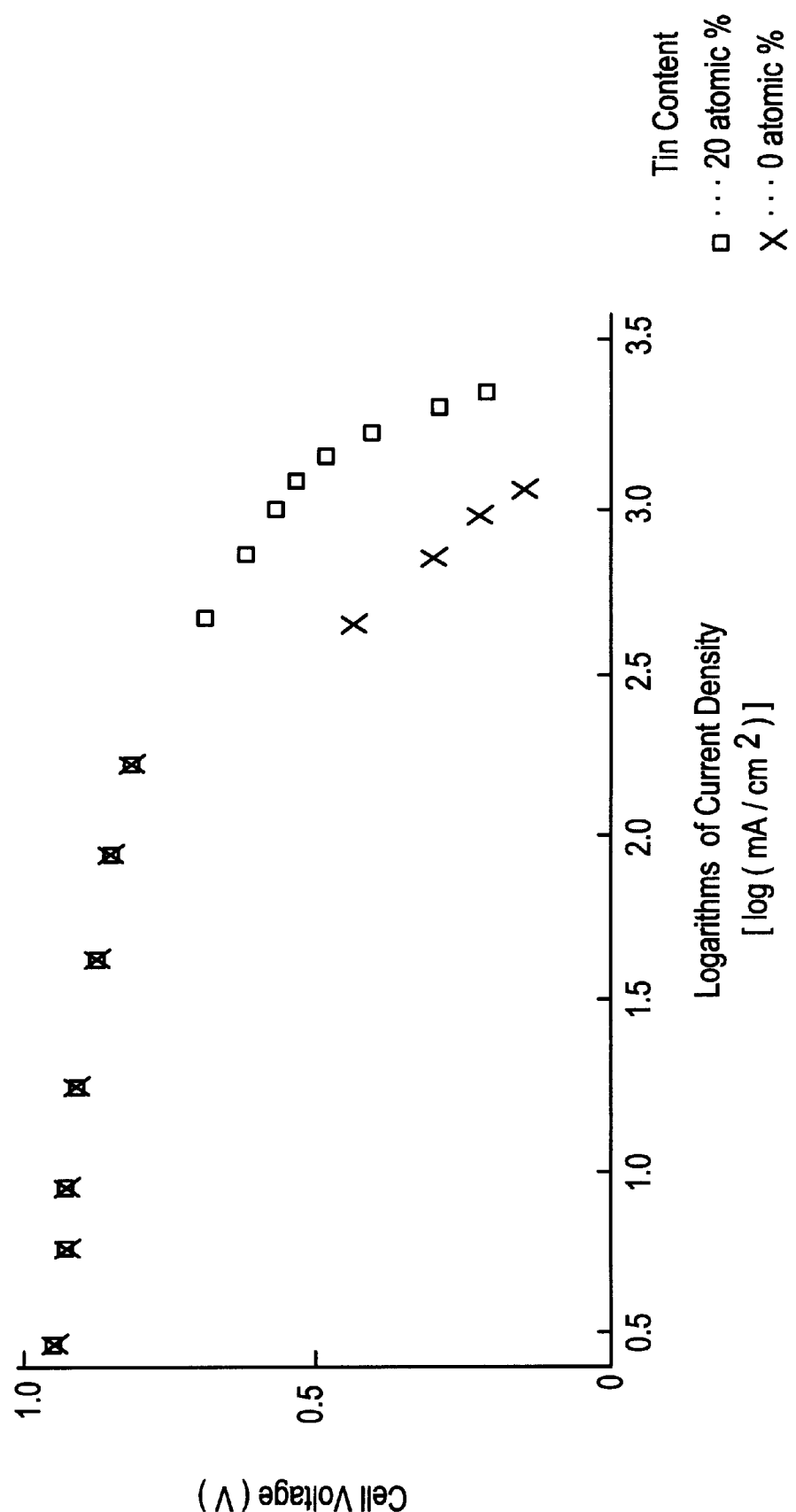
FIG. 2 is a graph showing relation between activities per unit surface area of electrodes of Example 6 and Comparative Example 2 and % in weight of tin.

Activities per unit gram of the platinum of the four electrodes of Example 6 and of the two electrodes of Comparative Example 2 were measured and the results are shown in FIG. 2. In FIG. 2, an axis of ordinate is an activity per unit surface area of the catalysts (calculated from the specific surface area obtained by means of TEM), and an axis of abscissa is atomic % of tin. in FIG. 2, □ is an activity at a cell voltage of 0.7 V and × is an activity at a cell voltage of 0.5 V. As apparent from FIG. 2, the activity was highest in the electrode in which a $Pt_aSn$ alloy phase was produced and the tin content was 20 atomic %. Although the values of the respective specific surface areas calculated by means of TEM in Table 1 were almost the same, the amount of the adsorbed carbon monoxide decreased with the increase of the amount of the tin added so that the said electrode was difficult to be poisoned with the carbon monoxide.

Figure 3:
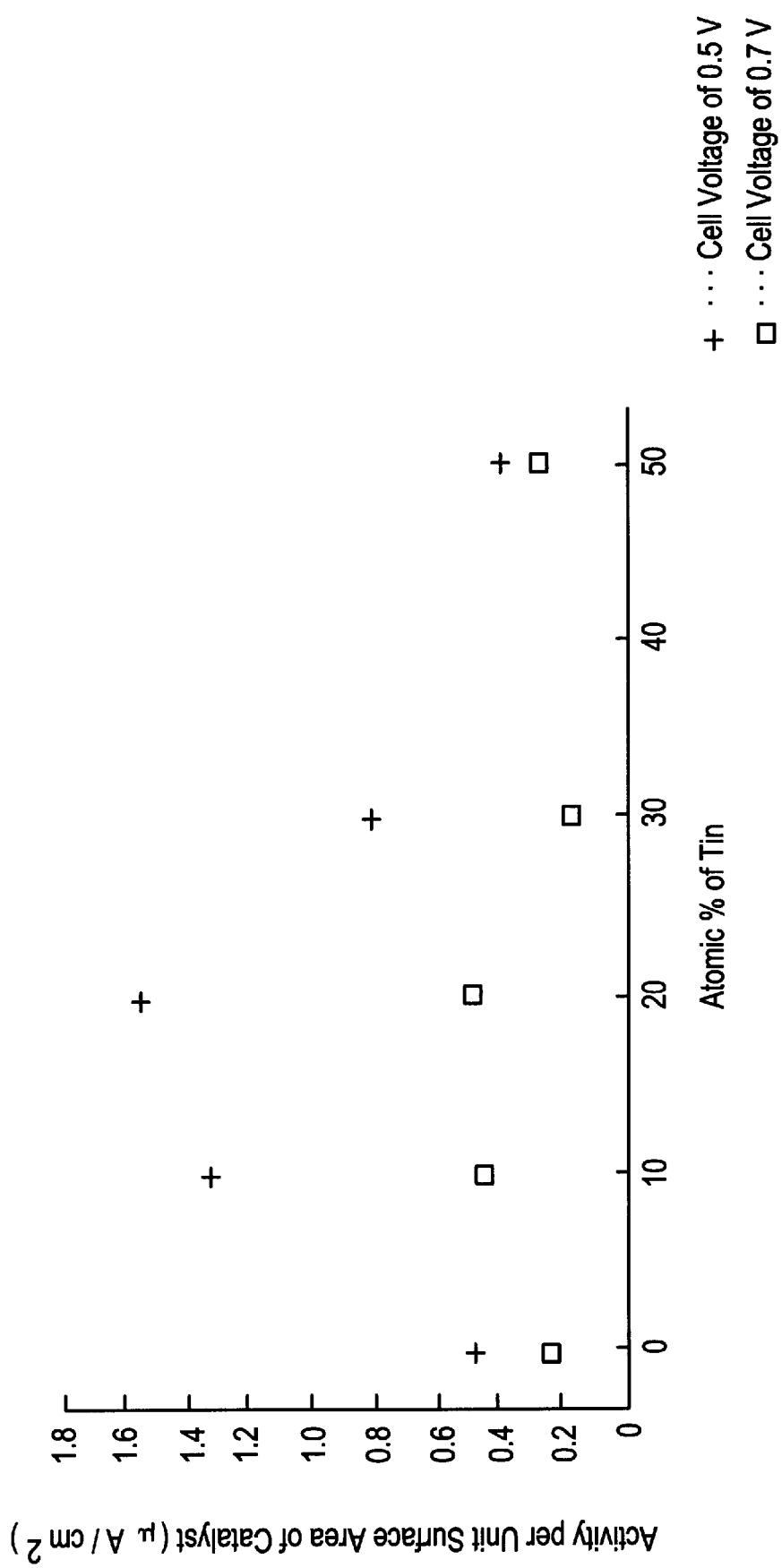
FIG. 3 is a graph showing relation between current densities and cell voltages of electrodes of Example 6 and Comparative Example 2.

Employing the electrodes of Example 6 of which a tin content was 20 atomic % and of Comparative Example 2 containing no tin, the relations of a current density and a cell voltage were measured. The results are shown in FIG. 3. As apparent from FIG. 3, the cell voltages of the both electrodes exhibited substantially no difference in the range where the current density was low, but the cell voltage of the electrode of Example 6 was remarkably higher at the high current density.

Example 7

A platinum-molybdenum thin layer was prepared and equipped to a rotation electrode apparatus in accordance with the same operations of Example 1 except that molybdenum was employed in place of tin.

Figure 4:
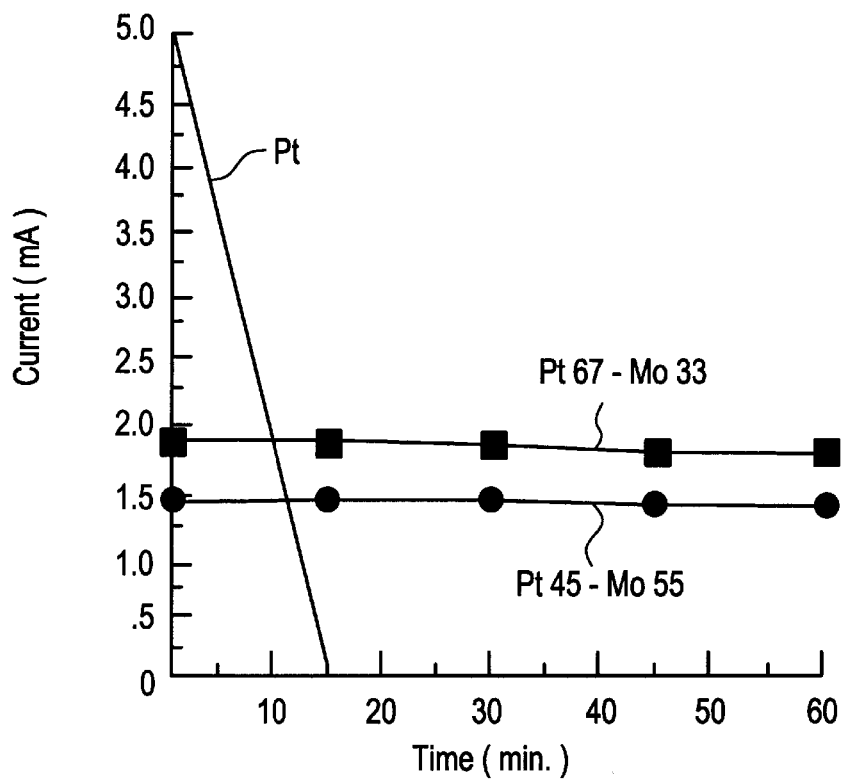
FIG. 4 is a graph showing current variation in time of molybdenum-noble metal electrodes of Example 7 and Comparative Example 3.

The rotation electrode having the alloy composition of Pt:Mo=67:33 (atomic %) was dipped in a 0.1 M perchloric acid aqueous solution, and the electrode was poisoned by bubbling hydrogen containing 100 ppm of carbon monoxide for one hour. Thereafter, voltage-current characteristic of the rotation electrode on time was measured at a rotation of 1500 r.p.m. employing a platinum electrode as a counter electrode with the continuous bubbling. The results are shown in FIG. 4. From FIG. 4, the current obtained was scarcely influenced with the lapse of operation time and was constant at about 1.8 mA.

Example 8

A rotation electrode was prepared in accordance with the procedures of Example 7 except that the atomic ratio of Pt and Mo was 45:55. The variation of the current on time was measured under the same conditions as those of Example 7 employing the electrode of this Example. The results are shown in FIG. 4. It is apparent from FIG. 4 that although the current obtained was smaller than that of Example 7, it was not influenced with the lapse of time and was maintained constant at about 1.4 mA.

Comparative Example 3

A rotation electrode was prepared in accordance with the procedures of Example 8 except that platinum was employed in place of the platinum-molybdenum alloy. Varlation of current on time was measured in accordance with the same conditions as those of Example 8 employing the rotation electrode. The results are shown in FIG. 4. It is apparent from FIG. 4 that while the initial current was as large as 5.0 mA, the activity was lost in a short period of time and no current was taken out after 15 minutes.

Example 9

A rotation electrode of palladium-molybdenum alloy was prepared in accordance with the procedures of Example 7 except that palladium was employed in place of the platinum, and variation of current on time of this rotation electrode was measured employing hydrogen containing 100 ppm of carbon monoxide as fuel. The current obtained was slightly lower than that of the rotation electrode of Example 7, but the rotation electrode of this Example could take out a current for a long period of time.

Example 10

A rotation electrode of ruthenium-molybdenum alloy was prepared in accordance with the procedures of Example 7 except that ruthenium was employed in place of the platinum, and variation of current on time of this rotation electrode was measured employing hydrogen containing 100 ppm of carbon monoxide as fuel. The current obtained was substantially the same as that of the rotation electrode of Example 7.

Example 11

Figure 5:
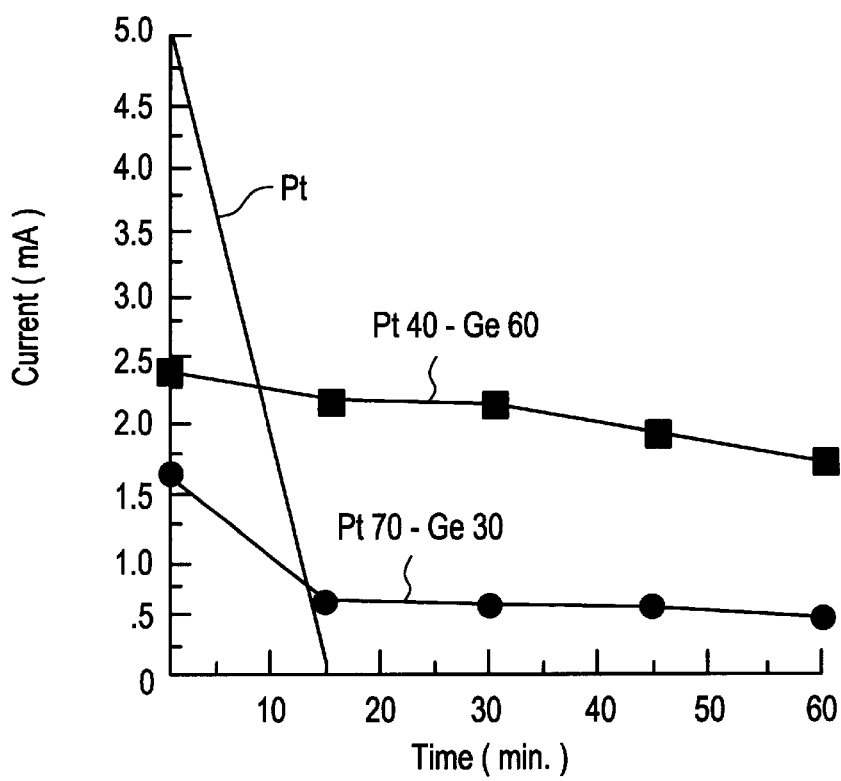
FIG. 5 is a graph showing current variation in time of germanium-noble metal electrodes of Example 7 and Comparative Example 3.

A rotation electrode of platinum-germanium alloy of 40:60 (atomic %) was prepared in accordance with the procedures of Example 7 except that germanium target was employed in place of the molybdenum target, and variation of current on time of this rotation electrode was measured under the same conditions of example 7. The results are shown in FIG. 5. From FIG. 5, it may be observed that the current obtained was more or less influenced with the lapse of the operation time, but it was maintained constant between 2.4 and 1.5 mA.

Example 12

A rotation electrode was prepared in accordance with the procedures of Example 11 except that the atomic ratio between platinum and germanium was set to be 70:30, and variation of current on time of this rotation electrode was measured under the same conditions of Example 11. The results are shown in FIG. 5. From FIG. 5, it may be observed that the current obtained was smaller than that of Example 11 and decreased from 1.6 mA, an initial value, to 0.5 mA and was maintained stable around this value.

What is claimed is:

1. An anode electrocatalyst for a fuel cell comprising an alloy of molybdenum and platinum, said molybdenum being present in the amount of 33 to 55 atomic %.

2. An anode electrocatalyst according to claim 1, wherein the alloy has a particle size of 10 to 60 Å.

3. An anode electrocatalyst according to claim 1, wherein the electrocatalyst is supported on a support having a surface area of 60 to 2,000 $m^2/g$.

* * * * *